July 29, 1958  B. C. COOK ET AL  2,844,865
MACHINE FOR ASSEMBLING NEEDLE BEARINGS
Filed April 25, 1956  4 Sheets-Sheet 1
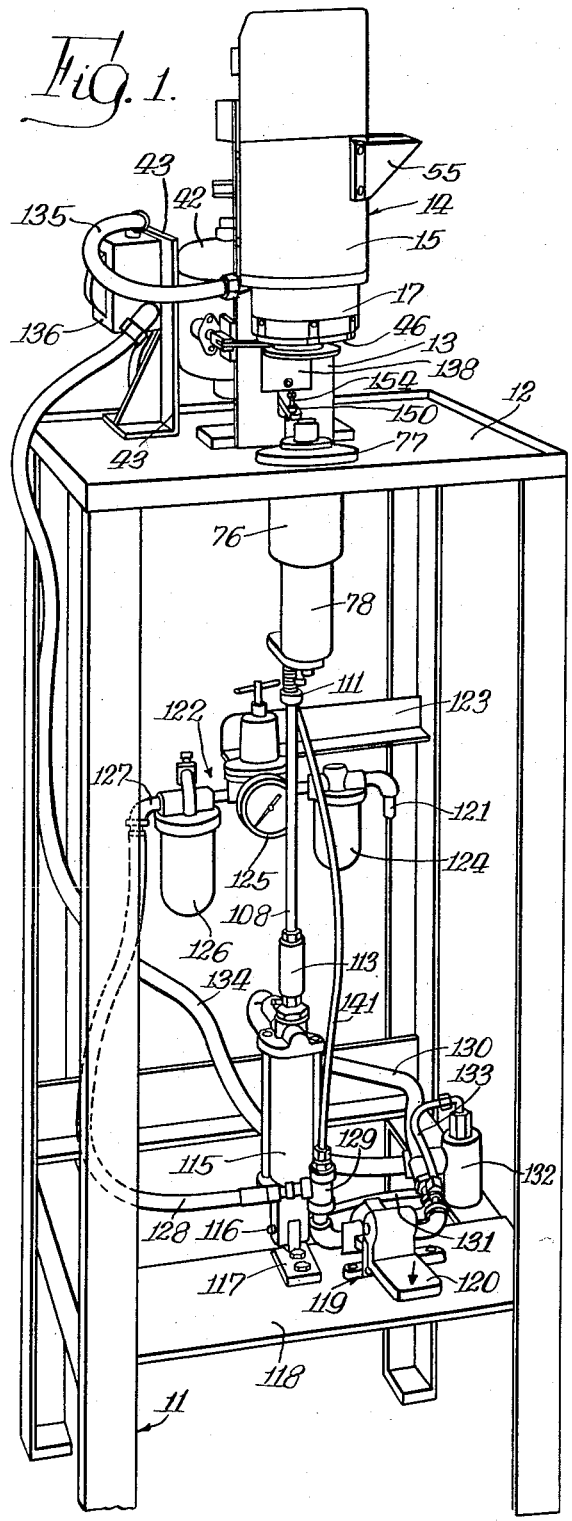
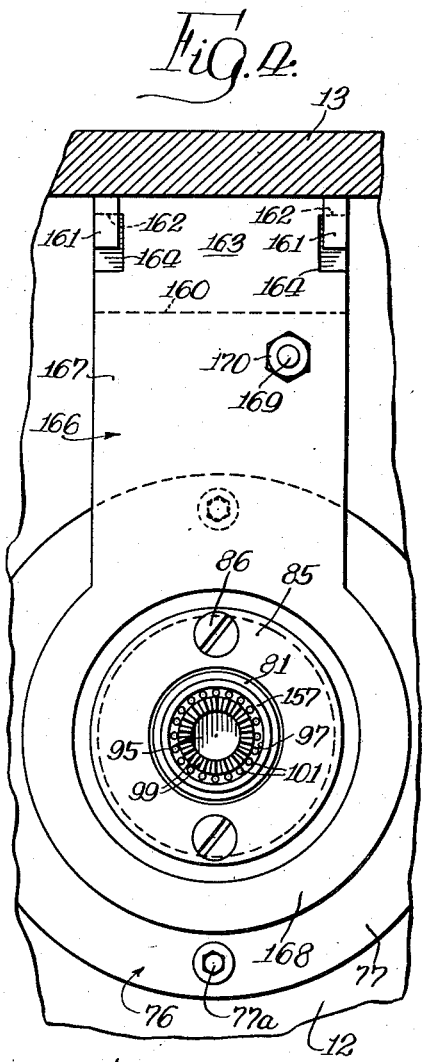
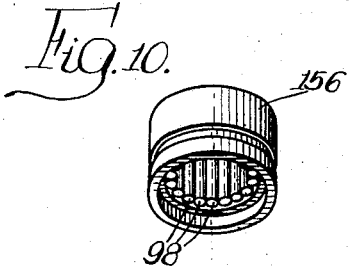
INVENTORS.
Bates C. Cook,
BY John Jokubonis,
Brown, Jackson, Boettcher
& Dienner  Attys.

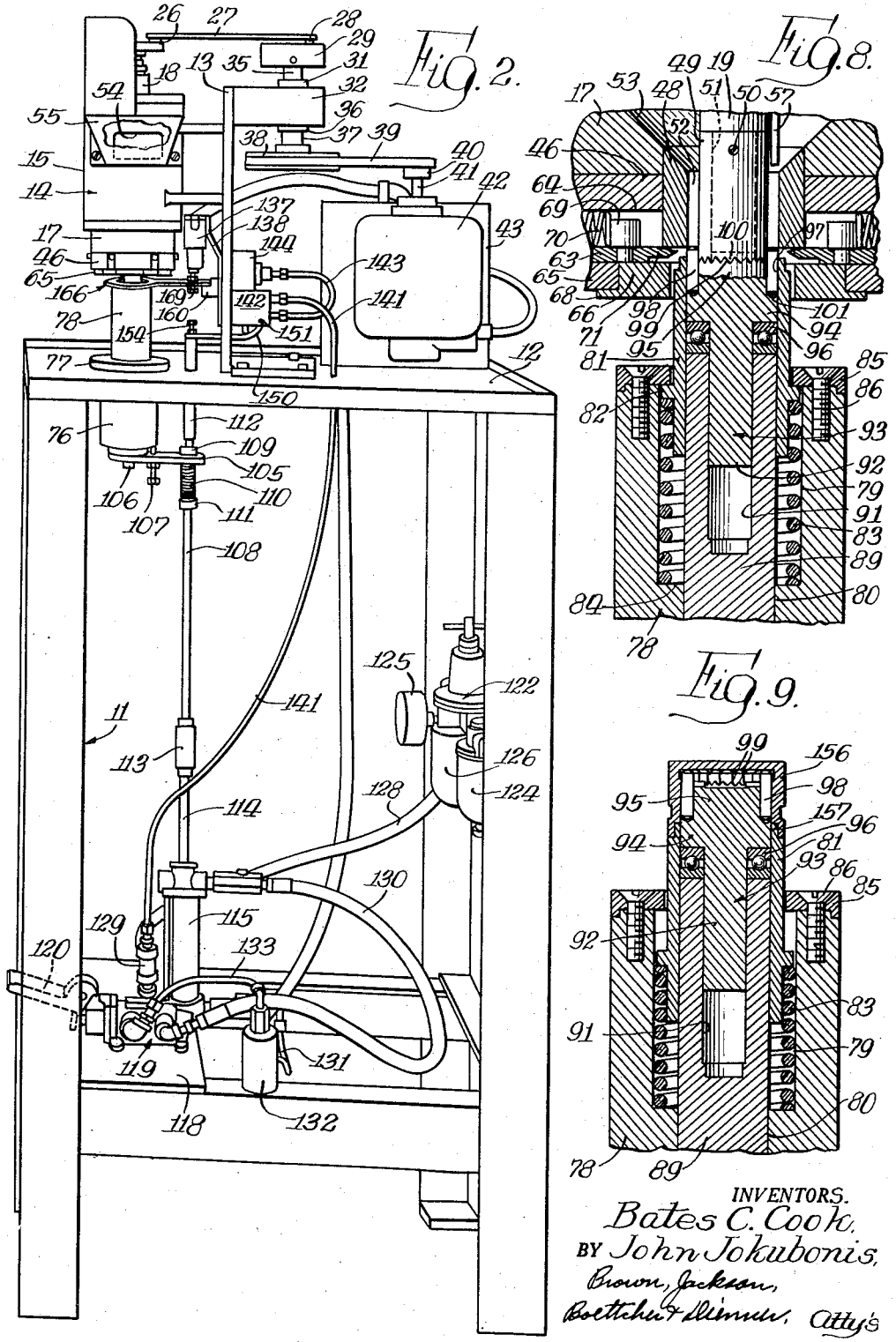

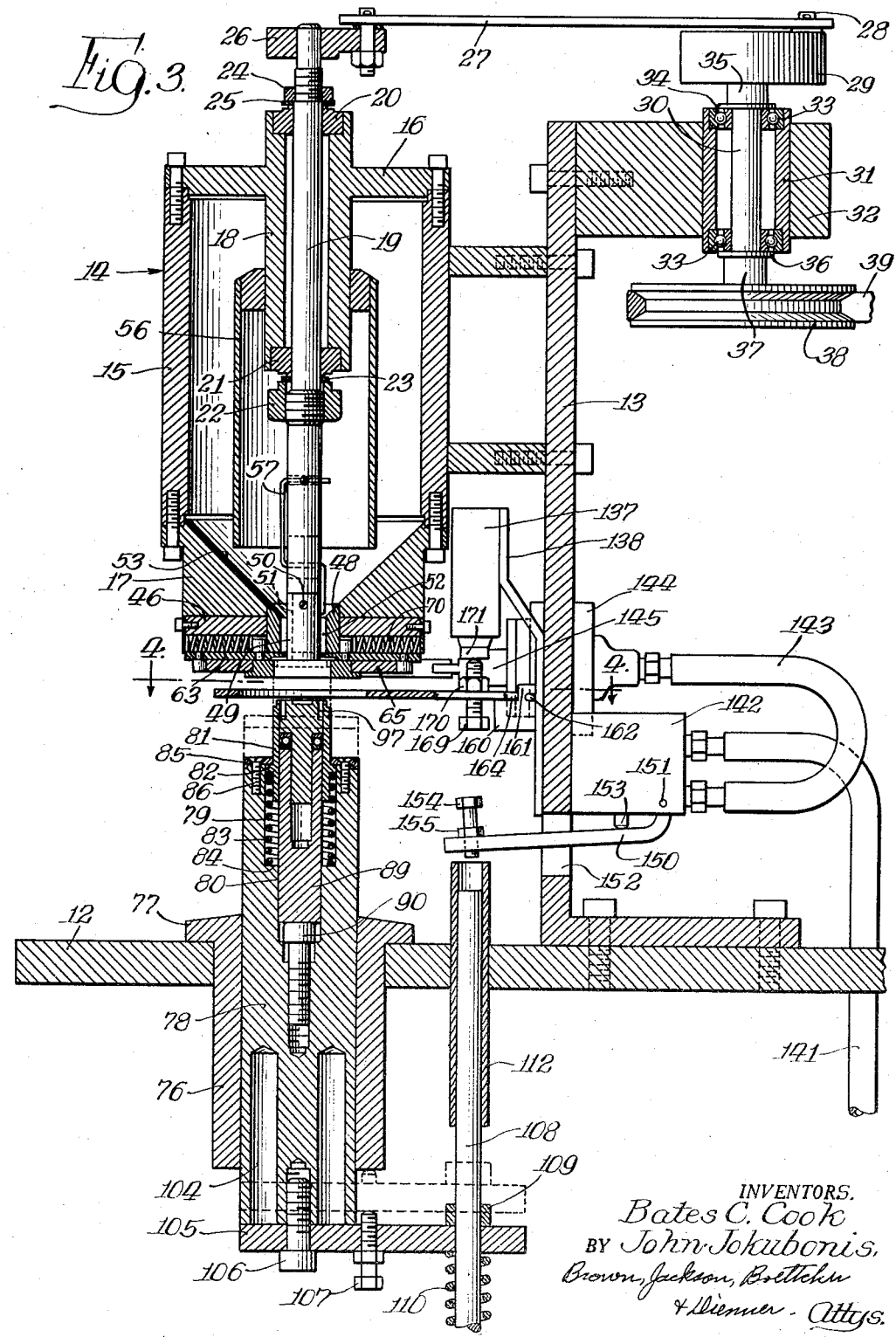

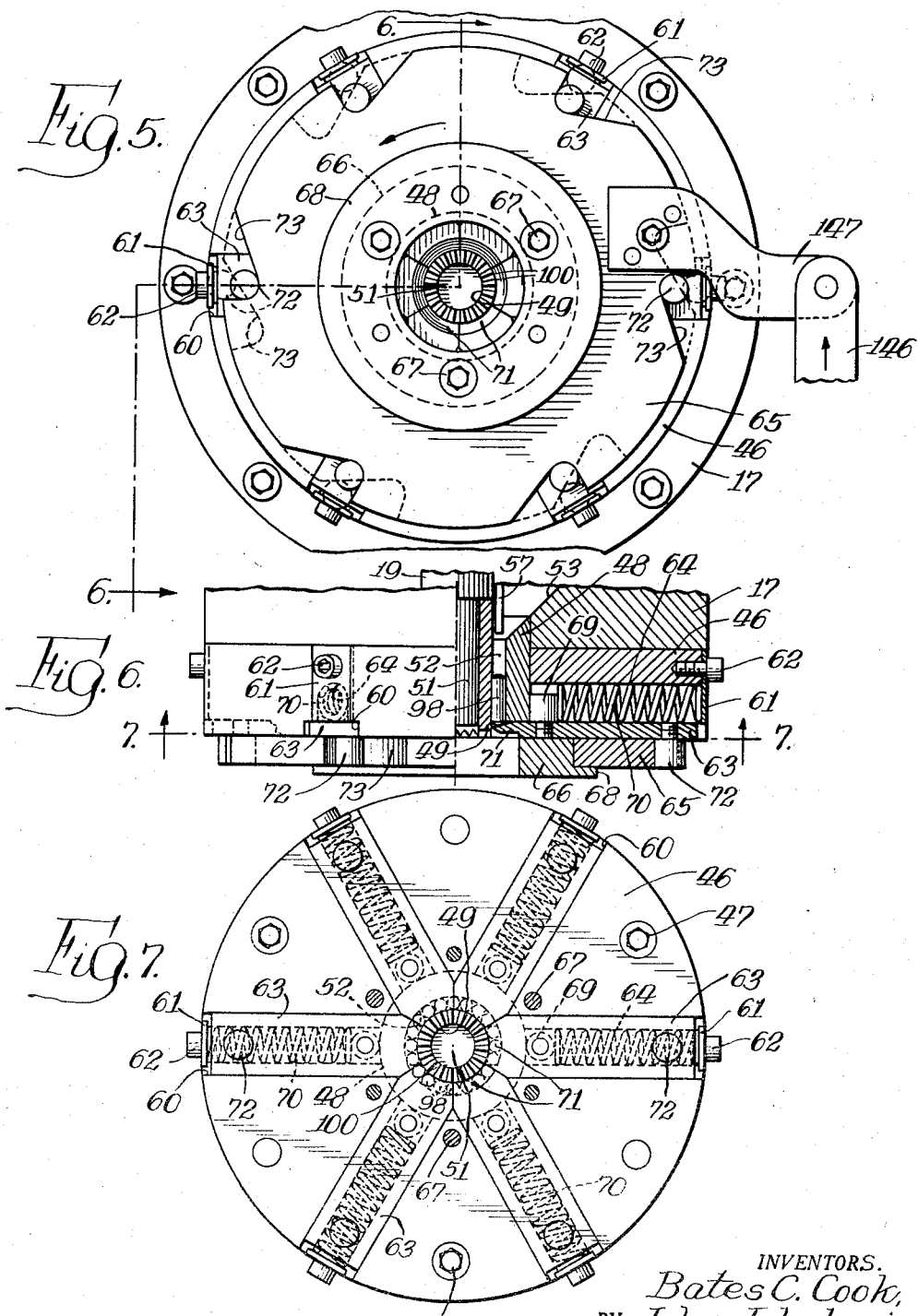

United States Patent Office 2,844,865
Patented July 29, 1958

2,844,865

MACHINE FOR ASSEMBLING NEEDLE BEARINGS

Bates C. Cook and John Jokubonis, Chicago, Ill., assignors to Cook & Chick Company, Chicago, Ill., a corporation of Illinois Application April 25, 1956, Serial No. 580,572

9 Claims. (Cl. 29—201)

This invention relates to machines for assembling bearings, particularly for assembling bearings having small bearing rollers, commonly termed needle bearings.

Assembling needle bearings by hand, even with the use of jigs, is tedious and time consuming and renders the cost of such bearings, in many instances, objectionably high. It is a primary object of our invention to provide a machine whereby anti-friction bearings, particularly needle bearings and bearings of like character, can be assembled at comparatively high speed with a resultant material saving in cost of production. While the machine of our invention is particularly suitable, in the form illustrated by way of example, for assembling needle bearings, it may be used for assembling any suitable type of anti-friction bearing. Our machine comprises a container or hopper which may be loaded with a supply of bearing members, such as bearing needles, the hopper having associated therewith means for assembling the bearing members in sets and for delivering a set of bearing members to receiving means adapted for reception of a bearing cage or race along which the bearing members in the receiving means extend, the race being provided with a coating of grease or any suitable material effective for causing the bearing members to adhere thereto so that when the race is removed from the receiving means the bearing members or needles are also removed with the race and remain thereon in proper assembled relation thereto. Accordingly, the machine of our invention comprises means for assembling a set of bearing members and delivering them to receiving means effective for retaining the bearing members in proper assembled relation, the assembling means and the receiving means having relative movement into and out of cooperating relation to each other and the receiving means being adapted for reception of a bearing cage or race to which the bearing members adhere, when the receiving means is out of cooperating relation to the bearing member assembling means. We also provide safety means whereby movement of the bearing member assembling means and the receiving means into cooperating relation one to the other is stopped promptly in the event the operator's hand should be positioned between them. Further objects and advantages of our invention will appear from the detail description.

In the drawings:

Figure 1 is a perspective front view of a needle bearing assembling machine embodying our invention;

Figure 2 is a perspective side view of the machine of Figure 1;

Figure 3 is a central vertical sectional view, on an enlarged scale, of the upper portion of the machine of Figure 1, taken in a plane extending from front to back thereof, certain parts being broken away and certain other parts being shown in elevation;

Figure 4 is a sectional view, on an enlarged scale, taken substantially on line 4—4 of Figure 3, certain parts being broken away and certain other parts being shown in plan;

Figure 5 is a bottom plan view, on an enlarged scale, of the head of the machine, with certain parts broken away;

Figure 6 is a sectional view taken substantially on line 6—6 of Figure 5, certain parts being shown in elevation;

Figure 7 is a sectional view taken substantially on line 7—7 of Figure 6;

Figure 8 is a fragmentary central vertical sectional view, on the same scale as Figure 7, of the base of the head of the machine and the upper portion of the bearing needle receiving means plunger, certain parts being broken away and certain other parts being shown in elevation;

Figure 9 is a fragmentary central vertical sectional view, on the same scale as Figure 8, of the bearing needle receiving means and associated parts, showing a needle receiving retainer or race on the upper end of the sleeve of the receiving means with the sleeve depressed for loading the bearing needles into the race; and Figure 10 is a perspective view of a bearing race loaded with bearing needles by means of the machine of our invention.

Referring to Figures 1 and 2 of the drawings, the form of the machine of our invention illustrated by way of example comprises a suitable frame 11 provided at its top with a plate or table 12 to which is secured an upwardly extending bracket 13 having mounted thereon a head 14. The head 14 comprises a cylindrical body 15 closed at its upper end by a removable cover 16, and a base member 17 removably secured to the lower end of body 15 and spaced a substantial distance above the plate or table 12, as shown more clearly in Figure 3. Cover 16 is provided with a central elongated sleeve 18 extending a substantial distance downward within body 15 and which receives a shaft 19 mounted for oscillatory movement through spaced bearing collars 20 and 21 seating in the recessed upper and lower ends, respectively, of sleeve 18. A nut 22 threaded on shaft 19 seats against a washer 23 seating on the lower end of collar 21 and restrains the latter against downward movement. A nut 24 is threaded on the upper end of shaft 19 and seats on a washer 25 seating on the upper end of collar 20 and in cooperation therewith restrains the shaft 19 against downward movement. An arm 26 is secured on the upper end of shaft 19 and has pivoted thereto one end of a link 27 the other end of which is pivoted to a crank pin 28 secured to a disc 29 fixed on the upper end of a shaft 30 rotatably mounted through a sleeve 31 fixed in an arm 32 bolted to and extending rearwardly from bracket 13 at the top thereof. The shaft 30 is rotatably mounted through ball bearings 33 which, in cooperation with an upper washer 34 disposed between the hub 35 of disc 29 and the upper bearing 33 and a washer 36 disposed between the lower bearing 33 and hub 37 of a V pulley 38 secured on the lower end of shaft 30, restrains that shaft against endwise movement. The V pulley 38 has driving connection, by means of a V belt 39 to a V pulley 40 secured on the upper end of shaft 41 of an electric motor 42 mounted on a second bracket 43 secured to and extending upward from the plate or table 12. As will be understood from what has been said, when the motor 42 is in operation, oscillatory movement is imparted to the shaft 19.

A circular plate or disc 46 of substantial thickness is secured by socket headed screws 47 (Figure 7) to the lower face of base member 17, the latter and disc 46 being provided with a central opening in which is mounted, with a tight fit, a collar 48 disposed coaxially with the shaft 19. A sleeve or tubular member 49 is removably secured, conveniently by a set screw 50, on a reduced stud 51 extending from the lower end of shaft 19. The member 49 is of less exterior diameter than the interior diameter of collar 48 and defines therewith an annular recess 52 for reception of a set of bearing needles. The lower end of member 49 preferably is disposed in the plane of the underface of disc 46, as shown. The inner or upper face 53 of base 17 is inclined downward to collar 48 the upper end of which is also inclined downward so as to provide a downwardly directed frustoconical surface leading to the upper end of the recess 52. The body 15 of head 14 constitutes a hopper to which an adequate supply of bearing needles may be delivered through an opening 54 at one side thereof, by means of chute 55 secured to body 15. A cylindrical baffle 56 is secured on sleeve 18 and extends downward therebeyond about shaft 19 to within a short distance of the inclined upper face of base 17. An agitator 57 is secured to shaft 19 and extends downwardly to within a short distance of the top of recess 52. The bearing needles poured into the body or hopper 15 are directed downwardly onto the inclined upper face of base 17 and are agitated by the agitator 57, during oscillation of shaft 19, so as to be directed into the recess 52 until the latter is completely filled with a complete set of needles disposed in concentric parallel relation about the axis of shaft 19, the bottom of recess 52 being then closed, as will be explained presently.

Referring to Figures 3, 6 and 7, disc 46 is provided at its underface with a plurality—six being shown—of radial grooves 60 closed at their outer ends by retaining plates 61 secured to disc 46 by cap screws 62. A shut-off finger 63 is slidably mounted in each of the grooves 60, each of which opens upwardly into a parallel bore 64 in disc 46 of materially less diameter than the width of groove 60. The fingers 63 are confined between the upper faces of the grooves 60 and a cam 65, shown more clearly in Figure 5, mounted for turning movement on a collar 66 secured to disc 46 by screws 67, collar 66 being provided at its lower end with an outer circumferential flange 68 providing a seat for cam 65 and restraining it against downward movement. Each of the shut-off fingers 63 is provided adjacent its inner end with an upwardly extending stud 69 which projects into bore 64 and is disposed to contacts collar 48 and in cooperation therewith limit inward movement of finger 63. A compression spring 70 is mounted in each bore 64 and is confined between stud 69 and the corresponding retainer plate 61 which seats in a recess in disc 47. The fingers 63 normally are held by the compression springs 70 in their projected inner positions, with the inner ends 71 thereof underlying recess 52 and in close proximity to the member 49, it being noted that the inner ends 71 of fingers 63 are beveled from opposite sides and also from their upper and lower surfaces so as to fit together snugly when in their inner projected positions, as shown in Figure 7, and so as to enter between two sets of bearing needles, as will be explained more fully later. Each of the fingers 63 is also provided, adjacent its outer end, with a downwardly extending stud 72. In the normal position of cam 65, shown in Figure 5, the studs 72 are disposed at the radially inner ends of substantially V-shaped notches 73 formed in the periphery of cam 65. The shut-off fingers 63 are then in their projected inner positions closing the bottom of recess 52, as shown in Figures 6 and 7 as well as in Figure 5. When the cam 65 is turned in counter-clockwise direction, as viewed in Figure 5, the inclined arms of notches 73 move the studs 72 outward, to the broken line positions indicated in Figure 5, thereby retracting the shut-off fingers 63 and opening the bottom of recess 52 for delivery therefrom of a set of bearing needles to the recess of receiving means, to be described later.

A sleeve 76 is mounted through table 12 and is provided at its upper end with an outer circumferential flange 77 seating on the upper face of table 12 and suitably secured thereto, conveniently by screws 77a (Figure 4). A plunger 78 is slidably mounted in sleeve 76 for vertical reciprocation and is disposed coaxially with shaft 19. Referring more particularly to Figures 3, 8 and 9, plunger 78 is provided with a bore 79 of substantial diameter extending from its upper end and having a downward extension 80 of reduced diameter. A sleeve 81 is mounted in the upper end of plunger 78 and extends downwardly into bore 79 and upwardly a substantial distance above plunger 78. Sleeve 81 is provided with an outer annular flange 82 seating on the upper end of a compression spring 83 within bore 79 and seating at its lower end on shoulder 84 of plunger 78. Flange 82 normally is in contact with a stop ring 85 secured by screws 86 to the upper end of plunger 78 and positively limiting upward movement of sleeve 81.

A secondary plunger 89 extends through sleeve 81 and downward therebeyond into the lower downward extensoin 80 of bore 79. At its lower end the secondary plunger 89 seats on the head of a screw 90 threaded into the main or primary plunger 78 for adjusting the height of plunger 89 and thereby the extent to which it projects upward beyond plunger 78, as shown in Figures 3 and 8. The inner or secondary plunger 89 is provided with an axial bore 91 extending from its upper end and receiving shank 92 of a receiving member 93 provided at its upper end with an outer circumferential flange 94 fitting snugly, but not tightly, within the sleeve 81, and with a cylindrical head 95 of reduced diameter relative to and extending upward from, flange 94. Flange 94 of receiving member 93 seats upon the upper race of a ball bearing 96 fitting snugly, but not tightly, within sleeve 81 with the lower race of the bearing seating on the upper end of the secondary or inner plunger 89. The head 95 of receiving member 93 is of less diameter than the interior diameter of sleeve 81 and defines with the upper portion thereof an annular recess 97 open at its top and closed at its bottom by the flange 94, as will be clear from Figures 3 and 8. The receiving member 93 is coaxial with the shaft 19 and head 95 of member 93 is of the same diameter as member 49. When the main or primary plunger 78 is in its uppermost position shown in Figure 8, the recess 97 is aligned with recess 52 for receiving from the latter a set of bearing needles 98, when the shut-off fingers are moved outward to retracted position, as shown in Figure 8, it being understood that the interior diameter of sleeve 81 is the same as the interior diameter of collar 48. The upper end of head 95 of member 93 is serrated at 99 and the lower end of member 49 is serrated at 100. Flange 94 of member 93 is provided at its upper face with protuberances 101. When the plunger 78 reaches its uppermost position, the serrations 99 of member 93 are interengaged with the serrations 100 of member 49 thus establishing driving connections therebetween so that the member 93 is oscillated with shaft 19 and member 49. The oscillation of member 93 imparts, through the protuberances 101, slight vertical or jiggling movement to the bearing needles 98 delivered to recess 97 from recess 52, assuring that the bearing needles in recess 97 will assume a vertical position so as to be accurately disposed in parallel relation about the axis of member 93.

Referring to Figure 3, the primary or main plunger 78 preferably is provided with a plurality of bores 104 extending from its lower end, for the purpose of reducing the weight of plunger 78. An arm 105 is suitably secured, conveniently by means of a cap screw 106, to the lower end of plunger 78. A stop screw 107, threaded through arm 105, is disposed to contact the lower end of sleeve 76 and thereby limit upward travel of plunger 78. An operating rod 108 is slidable through arm 105 and has secured thereon a collar 109 disposed to contact the upper face of arm 105 for moving plunger 78 downward with rod 108. A compression spring 110, mounted about rod 108 and confined between arm 105 and a lower collar 111 (Figures 1 and 2) secured on rod 108 normally holds arm 105 in contact with collar 109. The upper portion of rod 108 is slidable in a guide sleeve 112 secured in table 12. The lower end of rod 108 is connected by a coupling 113 to the upper end of piston rod 114 of a pneumatic or air cylinder 115 within which there operates a piston to which the piston rod 114 is secured, as will be understood. The pneumatic cylinder may be of any suitable type, that shown being known as a Schrader two way air cylinder. The cylinder 115 is pivotally connected at its lower end, at 116, to a bracket 117 mounted on a cross member 118 of frame 11 adjacent the bottom thereof. A four way foot operated valve 119, provided with an operating pedal 120, is mounted on cross member 118. The valve 119 may be of any suitable known type, that shown being known as a Schrader four way foot valve. Air under suitable pressure is supplied to valve 119 from a suitable source of supply connected to a nipple 121 attached to one end of an assembly 122 mounted on an angle member 123 of frame 11, the assembly 122 including an air filter 124, a pressure gauge 125 and an oiler 126, an outlet elbow 127 of assembly 122 being connected by a hose 128 to a fitting 129 connected to the inlet of valve 119. The top of cylinder 115 is connected to valve 119 by a hose 130 and the bottom or lower end of cylinder 115 is connected by a conduit 131 to the outlet of a solenoid valve 132 of suitable known type, that shown being known as a Skinner solenoid valve, mounted on frame 11. The inlet of solenoid valve 132 is connected by a conduit 133 to the valve 119. The solenoid valve 132 normally is open and the solenoid thereof is suitable connected by leads (not shown), contained in lengths of hose 134 and 135 leading from the motor switch box 136 mounted on bracket 43, to a suitable source of electrical energy and to a microswitch 137 mounted on a bracket 138 secured to the bracket 137. The microswitch 137 normally is open and when closed energizes a solenoid of valve 132 for closing the latter and thereby shutting off supply of compressed air to the lower end of cylinder 115, as will be explained more fully later.

Fitting 129 is also connected by a conduit 141 to a two way air valve 142 of known type, the valve shown being known as a Mead two way valve, mounted on bracket 13. Valve 142 is connected by a conduit 143 to an air cylinder 144 of suitable known type, the cylinder shown being known as a single acting Schrader cylinder, also mounted on bracket 13. Cylinder 144 has therein a piston (not shown) urged inward—toward the right as viewed in Figure 3—by a spring (not shown) to which is suitably secured a piston rod 145. The piston rod 145 is connected by a link 146 to an arm 147, shown more clearly in Figure 5, secured to cam 65 at the underface thereof. Normally piston rod 145 is in its retracted position shown in Figure 3 and the cam 65 is in its position shown in Figure 5 with the shut-off fingers 63 in their projected positions closing the bottom of the recess 52.

The valve 142 is provided with a control lever 150 pivoted at 151 and extending forwardly through an opening 152 in the bracket 13. Lever 150 underlies an operating plunger or button 153 of valve 142 and overlies the guide sleeve 112. A screw 154 is threaded through lever 150 in alignment with rod 108 and is secured in adjustment by a jam nut 155. When the pedal 120 of the valve 119 is depressed, air is exhausted from the lower end of cylinder 115 and the plunger 78 is then in its fully lowered position, shown in Figure 1, it being noted that in Figures 2 and 3 plunger 78 is shown as being in an upper or raised position. When pedal 120 is released air is admitted to the lower end of cylinder 115 and is exhausted from the upper end thereof, causing upward movement of rod 108 and with it the plunger 78. As the plunger 78 reaches the limit of its upward travel rod 108 contacts screw 154 and swings the valve lever 150 upward imparting upward movement to button 153 of valve 142 and thereby admitting air under pressure to the air cylinder 144. That causes the piston rod 145 to be projected thereby turning cam 65 in counterclockwise direction, as viewed in Figure 5, and opening the bottom of recess 52 so that the set of bearing needles assembled therein drops into the recess 97 of the receiving means, as shown in Figure 8. The pedal 120 is then depressed and air is exhausted from the lower end of cylinder 115 and air under pressuse is admitted to the upper end thereof causing movement of the plunger 78 to its fully lowered position shown in Figure 1. At the start of the downward movement of plunger 78 and of rod 108, valve lever 150 is released and moves downward so as to shut off the supply of compressed air to cylinder 144 and exhaust air from the latter. The piston rod 145 is then retracted thereby turning cam 65 in clockwise direction to its normal position shown in Figure 5, and permitting inward movement of the cut-off fingers 63. During such inward movement of fingers 63 the tapered inner ends 71 thereof pass between the set of bearing needles in recess 97 of the receiving means and the needles in recess 52 of the feed means thereby closing the bottom of recess 52 and retaining therein the bearing needles which have entered the latter recess. By alternately depressing and releasing pedal 120 of the valve 119 the operation of delivering a set of bearing needles from the feed means to the receiving means and moving the latter downward clear of the feed means may be repeated at comparatively high speed. When the receiving means has been moved clear of the feed means, a bearing race 156 of appropriate size, provided with a coating of grease or other suitable material on its bearing receiving surface, is seated upon the upper end of sleeve 81 which is then forced downward in opposition to compression spring 83, as shown in Figure 9. In Figure 9 the race 156 is shown as a cap closed at one end and having an inner diameter equal to the diameter of flange 94 of member 93. The circumferential inner face of cap 156 is coated with a suitable material, such as a heavy grease, and the upper portions of the bearing needles 98 project into the cap 156 when it is first seated upon sleeve 81, it being noted that the depth of the recess 97 of the receiving means, when sleeve 81 is in its normal fully raised position, is somewhat less than the length of the bearing needles 98, as shown in Figure 8. Thereafter the sleeve 48 is moved downward by pressure applied to the cap 156 which moves downward along the set of bearing needles 98. The cap 156 is then lifted from the sleeve 81 with the complete set of bearing needles 98 adhering to the inner face of the cap. In that manner, the needle bearing, including the bearing needles and the race, may be assembled with expedition and facility. Conveniently the lower end of cap 156 is provided with an interior rabbet or groove and the upper end of sleeve 81 is of reduced diameter to provide an upwardly extending flange 157 adapted to fit snugly into the rabbett or groove in cap 156. That is desirable as facilitating positioning of the race in centered relation to the receiving means, but is not essential to our invention. It will be understood that the cap 156 is shown by way of illustration only and that any suitable race may be used for receiving the bearing needles.

A bracket 160 provided at each end with an upwardly extending finger 161 is mounted on the front of bracket 13. The fingers 161 are provided with openings which loosely receive fingers 162 at the rearward or inner end of a reduced neck 163 between lengthwise slots 164 cut in the sides of a guard member or safety lever 166 comprising an oblong body portion 167 having at its forward end an annular head 168 underlying head 14. The head 168 of safety lever 166 is concentric with plunger 78, as will be understood, and the inner diameter of head 168 is adequate to avoid possibility of actuation of safety lever 166 by either the plunger 78 or the associated receiving means. Safety lever 166 normally rests upon the bracket 160 so as to be supported thereby in its horizontal position shown in Figure 3. A switch operating screw 169 is threaded through body 167 of safety lever 166 and is secured in adjustment by a jam nut 170. The screw 169 is disposed in alignment with and in proximity to an operating member or button 171 extending from the lower end of the microswitch 137. As previously explained, when pedal 120 of the switch 19 is depressed the plunger 78 is moved downward to its position shown in Figure 1 so that the bearing race may be moved downward with the sleeve 81 for receiving the bearing needles 98, as shown in Figure 9 and previously explained. In the event the operator's foot slips from the pedal 120, during the operation of assembling the bearing, the plunger would move upward and in such upward movement of the plunger the operator's hand would contact the safety lever 166 moving it upward. When that occurs, the microswitch 137 is closed by the screw 169 thereby closing the solenoid valve 132 effective for stopping upward movement of plunger 78. That avoids risk of injury to the operator in such cases.

As above indicated, and as will be understood, changes in detail may be resorted to without departing from the field and scope of our invention, and we intend to include all such variations, as fall within the scope of the appended claims, in this application in which the preferred form only of our invention has been disclosed.

We claim:

1. In a machine for assembling needle bearings, a bearing needle hopper having a cylindrical bottom opening, a shaft mounted for turning movement extending downward in said hopper coaxially with said opening, a member on the lower end of said shaft extending into said opening defining therewith a vertically disposed annular recess of uniform radial extent open at its top for reception of a set of bearing needles, the inner bottom surface of said hopper being inclined downward to said recess, means for turning said shaft, receiving means having an annular recess of uniform radial extent closed at its bottom and open at its top and underlying and aligned with said hopper recess, means for moving said receiving means to an upper position in cooperating relation to said hopper recess for receiving therefrom a set of bearing needles and then downward to a lower position clear of said hopper, and means for opening the bottom of said hopper recess when said receiving means reaches its said upper position and closing the bottom of said hopper recess when said receiving means starts downward.

2. In a machine for assembling needle bearings, a bearing needle hopper having a cylindrical bottom opening, an oscillatory shaft extending downward in said hopper coaxially with said opening, a member on the lower end of said shaft extending into said opening defining therewith a vertically disposed annular recess of uniform radial extent open at its top for reception of bearing needles, the inner bottom surface of said hopper being inclined downward to said opening, an agitator on said shaft adjacent and above said recess substantially aligned therewith, means for oscillating said shaft, receiving means having an annular recess of uniform radial extent closed at its bottom and open at its top and underlying and aligned with said hopper recess, means for moving said receiving means to an upper position in cooperating relation to said hopper recess for receiving therefrom a set of bearing needles and to a lower position clear of said hopper, said member and said receiving means having means establishing driving connection therebetween when said receiving means is in its said upper position, and means for opening the bottom of said hopper recess when said receiving means reaches its said upper position and closing the bottom of said hopper recess when said receiving means starts downward.

3. In a machine for assembling needle bearings, a bearing needle hopper having a cylindrical bottom opening, an oscillatory shaft extending downward in said hopper coaxially with said opening, a member on the lower end of said shaft extending into said opening defining therewith a vertically disposed annular recess of substantially uniform radial extent open at its top for reception of bearing needles, the inner bottom surface of said hopper being inclined downward to said opening, an agitator on said shaft adjacent and above said recess substantially aligned therewith, means for oscillating said shaft, receiving means having an annular recess of substantially uniform radial extent closed at its bottom and open at its top and underlying and aligned with said hopper recess, means for moving said receiving means to an upper position in cooperating relation to said hopper recess for receiving therefrom a set of bearing needles and to a lower position clear of said hopper, said member and said receiving means having means establishing driving connection therebetween when said receiving means is in its said upper position and said receiving means having protuberances at the bottom of said recess thereof, and means for opening the bottom of said hopper recess when said receiving means reaches its said upper position and closing the bottom of said hopper recess when said receiving means starts downward.

4. In a machine for assembling needle bearings, a bearing needle hopper having at its bottom a vertically disposed annular needle receiving recess of substantially uniform radial extent open at its upper end, the bottom of said hopper being inclined downwardly to said recess, closure means normally closing the bottom of said recess, oscillatory agitator means for assembling in said recess a set of bearing needles, reciprocatory receiving means having an annular recess of substantially uniform radial extent the same as that of said hopper recess closed at its bottom and open at its top and underlying and aligned with said hopper recess, means for moving said receiving means to an upper position with said recess thereof in proximity to the bottom of said hopper recess for receiving therefrom a set of bearing needles and to a lower position clear of said hopper, said receiving means being in part displaceable to expose a set of bearing needles therein for reception of a race, and means for moving said closure means to open position when said receiving means reaches its said upper position and to closed position when said receiving means starts downward.

5. In a machine for assembling needle bearings, a bearing needle hopper having at its bottom a vertically disposed annular recess of substantially uniform radial extent open at its upper end, the bottom of said hopper being inclined downwardly to said recess, closure means normally closing the bottom of said recess, agitator means for assembling in said recess a set of bearing needles, a substantially vertical reciprocatory plunger underlying said hopper, a sleeve slidable in the upper end of said plunger yieldingly urged upward and having limited upward relative movement, a member at the upper end of said plunger having a head provided with an exterior circumferential flange fitting in said sleeve, said head defining with said sleeve a lower annular recess of uniform radial extent closed at its bottom by said flange and open at its top and underlying said hopper recess in alignment therewith, means for moving said plunger to an upper position with said lower recess in proximity to the bottom of said hopper recess for receiving therefrom a set of bearing needles and to a lower position with said lower recess spaced from said hopper, and means for moving said closure means to open position when said plunger reaches its said upper position and to closed position when said plunger starts downward.

6. In a machine for assembling needle bearings, a bearing needle hopper having a base provided with a vertically disposed annular recess of substantially uniform radial extent open at its upper end, the upper face of said base being inclined downwardly to said recess, shut-off fingers slidably mounted on said base yieldingly held in an inner projected position closing the bottom of said recess, agitator means for assembling in said recess a set of bearing needles, reciprocatory receiving means having an annular recess of uniform radial extent closed at its bottom and open at its top and underlying and aligned with said hopper recess, means for moving said receiving means to an upper position with said recess thereof in proximity to the bottom of said hopper recess for receiving therefrom a set of bearing needles and to a lower position clear of said hopper, said receiving means being in part displaceable to expose a set of bearing needles therein for reception of a race, and means for moving said cut-off fingers to an outer retracted position opening the bottom of said hopper recess when said receiving means reaches its said upper position and for releasing said shut-off fingers for closing thereof when receiving means starts downward.

7. In a machine for assemblying needle bearings, a bearing needle hopper, a base member secured to said hopper, a plate secured to the under face of said member, a cam mounted for turning movement at the under face of said plate, a collar mounted in said base member and plate, a member extending downwardly in said collar defining therewith an annular hopper recess of uniform extent radially and open at its upper end, the upper face of said base member being inclined downwardly to said recess, shut-off fingers slidably mounted in said plate yieldingly held in an inner projected position closing the bottom of said recess, said fingers and cam having cooperating means for moving said fingers to an outer retracted position opening the bottom of said recess when said cam is turned in one direction and for releasing said fingers for inward movement when said cam is turned in the opposite direction, reciprocatory receiving means having an annular recess of uniform extent radially closed at its bottom and open at its top and underlying and aligned with said hopper recess, means for moving said receiving means to an upper position with said recess thereof in proximity to the bottom of said hopper recess for receiving therefrom a set of bearing needles and to a lower position clear of said hopper, said receiving means being in part displaceable to expose a set of bearing needles therein for reception of a race, and means for turning said cam in said one direction when said receiving means reaches its said upper position and in said opposite direction when said receiving means starts downward.

8. In a machine for assembling needle bearings, a bearing needle hopper having a cylindrical bottom opening, an oscillatory shaft extending downward in said hopper coaxially with said opening, a member on the lower end of said shaft extending into said opening defining therewith a vertically disposed annular recess of uniform extent radially and open at its top for reception of bearing needles from said hopper, the inner bottom surface of said hopper being inclined downward to said opening, means for oscillating said shaft, receiving means having an annular recess of uniform extent radially closed at its bottom and open at its top and underlying and aligned with said hopper recess, means for moving said receiving means to an upper position in cooperating relation to said hopper recess for receiving therefrom a set of bearing needles and to a lower position clear of said hopper, said member and said receiving means having means establishing driving connection therebetween when said receiving means is in its said upper position and said receiving means having proturberances at the bottom of said recess thereof, and means for opening the bottom of said hopper recess when said receiving means reaches its said upper position and closing the bottom of said hopper recess when said receiving means starts downward.

9. In a machine for assemblying needle bearings, a bearing needle hopper having at its bottom a vertically disposed annular recess of uniform extent radially, closure means normally closing the bottom of said recess, means for assembling in said recess a set of bearing needles, a substantially vertical reciprocatory plunger underlying said hopper, receiving means at the upper end of said plunger having an annular recess of uniform extent radially closed at its bottom and open at its top and aligned with said hopper recess, means for moving said plunger to an upper position with said recess of said receiving means in proximity to the bottom of said hopper recess for receiving therefrom a set of bearing needles and to a lower position with said receiving means disposed clear of said hopper, means for moving said closure means to open position when said plunger reaches its said upper position and to closed position when said plunger starts downward, a guard member below and adjacent said hopper mounted for upward movement and having an opening to accommodate said plunger, and means for stopping upward movement of said plunger responsive to upward movement of said guard member.

References Cited in the file of this patent

UNITED STATES PATENTS

| | | |
|---|---|---|
| 1,387,881 | Bingham | Dec. 16, 1921 |
| 1,401,680 | Dlesk | Dec. 27, 1921 |
| 1,517,574 | Morrison | Dec. 2, 1924 |
| 1,723,369 | Pew | Aug. 6, 1929 |
| 1,758,653 | Cramer | May 13, 1930 |
| 2,057,692 | Rehnberg | Oct. 20, 1936 |
| 2,075,050 | Nowinski | Mar. 30, 1937 |
| 2,215,134 | Rehnberg | Sept. 17, 1940 |
| 2,255,626 | Ortegren | Sept. 9, 1941 |